United States Patent [19]

Ekholm

[11] Patent Number: 5,649,712
[45] Date of Patent: Jul. 22, 1997

[54] DEVICE FOR SEALING AN ANNULAR SPACE HAVING OPPOSING FLANGES, A SUPPORT BEAD, AND SEALING LIP

[75] Inventor: Kenneth Ekholm, Forsheda, Sweden

[73] Assignee: Forsheda AB, Sweden

[21] Appl. No.: 723,284

[22] Filed: Sep. 30, 1996

Related U.S. Application Data

[63] Continuation of Ser. No. 465,623, Jun. 5, 1995, abandoned.

[30] Foreign Application Priority Data

Jun. 8, 1994 [SE] Sweden .................................. 9402010
Aug. 18, 1994 [SE] Sweden .................................. 9402752

[51] Int. Cl.⁶ ........................................................ F16J 15/10
[52] U.S. Cl. .................... 277/207 A; 277/209; 277/211; 285/230; 285/231; 285/910
[58] Field of Search ................................ 277/178, 207 A, 277/208, 209, 211; 285/110, 230, 231, 232, 910

[56] References Cited

U.S. PATENT DOCUMENTS

| 3,081,102 | 3/1963 | Murray | 277/178 |
| 4,546,987 | 10/1985 | Bucher | 277/207 A |

FOREIGN PATENT DOCUMENTS

| 1448157 | 8/1966 | France . | |
| 71.19616 | 5/1971 | France . | |
| 1 185 431 | 1/1965 | Germany . | |
| 50 019 | 12/1967 | Germany . | |
| 59019 | 12/1967 | Germany | 285/110 |
| 1 944 832 | 3/1971 | Germany . | |
| 2 014 329 | 10/1972 | Germany . | |
| 2 402 022 | 9/1974 | Germany . | |
| 25 19 540 | 11/1976 | Germany . | |
| 8 801 130 | 11/1989 | Netherlands . | |
| 307 481 | 1/1969 | Sweden . | |
| 471 342 | 5/1969 | Sweden . | |
| 385 957 | 7/1976 | Sweden . | |
| 1 083 451 | 9/1967 | United Kingdom . | |
| 1 116 951 | 6/1968 | United Kingdom . | |
| 1 350 593 | 4/1974 | United Kingdom . | |
| 2 230 833 | 10/1990 | United Kingdom . | |

*Primary Examiner*—Scott Cummings
*Attorney, Agent, or Firm*—Baker & Daniels

[57] ABSTRACT

A device for sealing a space between an annular wall defining an opening and a pipe end portion introduced into the opening consists of a sleeve (2) having at one end thereof a flange (4) for restricting the introduction of the sleeve into the opening and having at its other end a flange (6) for restricting the introduction of the pipe end portion into the sleeve.

8 Claims, 4 Drawing Sheets

DEVICE FOR SEALING AN ANNULAR SPACE HAVING OPPOSING FLANGES, A SUPPORT BEAD, AND SEALING LIP

This is a continuation of application Ser. No. 08/465,623, filed Jun. 5, 1995, now abandoned.

The present invention relates to a device for sealing a space between an annular wall defining an opening and a pipe end portion introduced into the opening.

The device according to the invention is of the kind comprising a sleeve consisting of rubber-elastic material, which is adapted at its outer surface sealingly to engage the annular wall and at its inner surface sealingly to engage the outer surface of the pipe end portion introduced into the opening.

Devices of this kind can be used, for example, for connecting a plastic pipe with an opening formed in a well ring or a pipe consisting of concrete and extending transversely to the axis of the well ring or the pipe. A device of said kind can also be used for axially connecting two pipes with each other in the case that one of the pipes has an outer diameter which is less than the inner diameter of the other pipe; one of the pipes being constituted by a plastic pipe and the other pipe being constituted by a concrete pipe. A device of said kind can also be used also for connecting a socket of a first pipe with a spigot end of a second pipe.

Previously known devices of the kind in question have drawbacks in respect of the determination of the correct position of the sleeve in relation to the opening in which the sleeve is positioned and/or the determination of the position of the pipe end portion introduced into the opening in relation to the sleeve. Deficiencies in respect of the determinations of the correct positions usually result in deficiencies in respect of the sealing of the space between the wall of the opening and the pipe end portion introduced into the opening.

The object of the invention is to provide a device for sealing a space between an annular wall defining an opening and a pipe end portion introduced into the opening, the device being improved in the respects mentioned above.

In order to comply with this object the device according to the invention is characterized in that the sleeve has at one end thereof an outwardly directed flange for restricting the introduction of the sleeve into the opening and has at its other end an inwardly directed flange for restricting the introduction of the pipe end portion into the sleeve.

It is preferred that the sleeve of the device according to the invention have at least one continuous, radially inwardly or outwardly directed sealing lip and that the sleeve axially inside one of the flanges have a radially directed, continuous support bead extending in the same direction as the sealing lip and have at the end of the sleeve at which the other flange is positioned a radially directed, continuous support strip extending in the same direction as the sealing lip and the support bead. As a consequence of the presence of the support bead and the support strip, the sleeve will take an exactly centered position in relation to the surface engaged by the sealing lip which in turn secures the correct functioning of the sealing lip.

In a preferred embodiment of the device according to the invention the sleeve has, at its surface opposite to the sealing lip, continuous ridges securing the tightness between the sleeve and the annular wall defining the opening. When using the device according to the invention for connecting a pipe end portion to an opening of a pipe or a well ring manufactured from reinforced concrete the ridges also prevent water from getting into contact with the reinforcing irons of the concrete pipe or the well ring. The reinforcing irons are uncovered at the annular wall defining the opening when the opening is provided.

The invention is described below with reference to the accompanying drawings.

Figure 1:
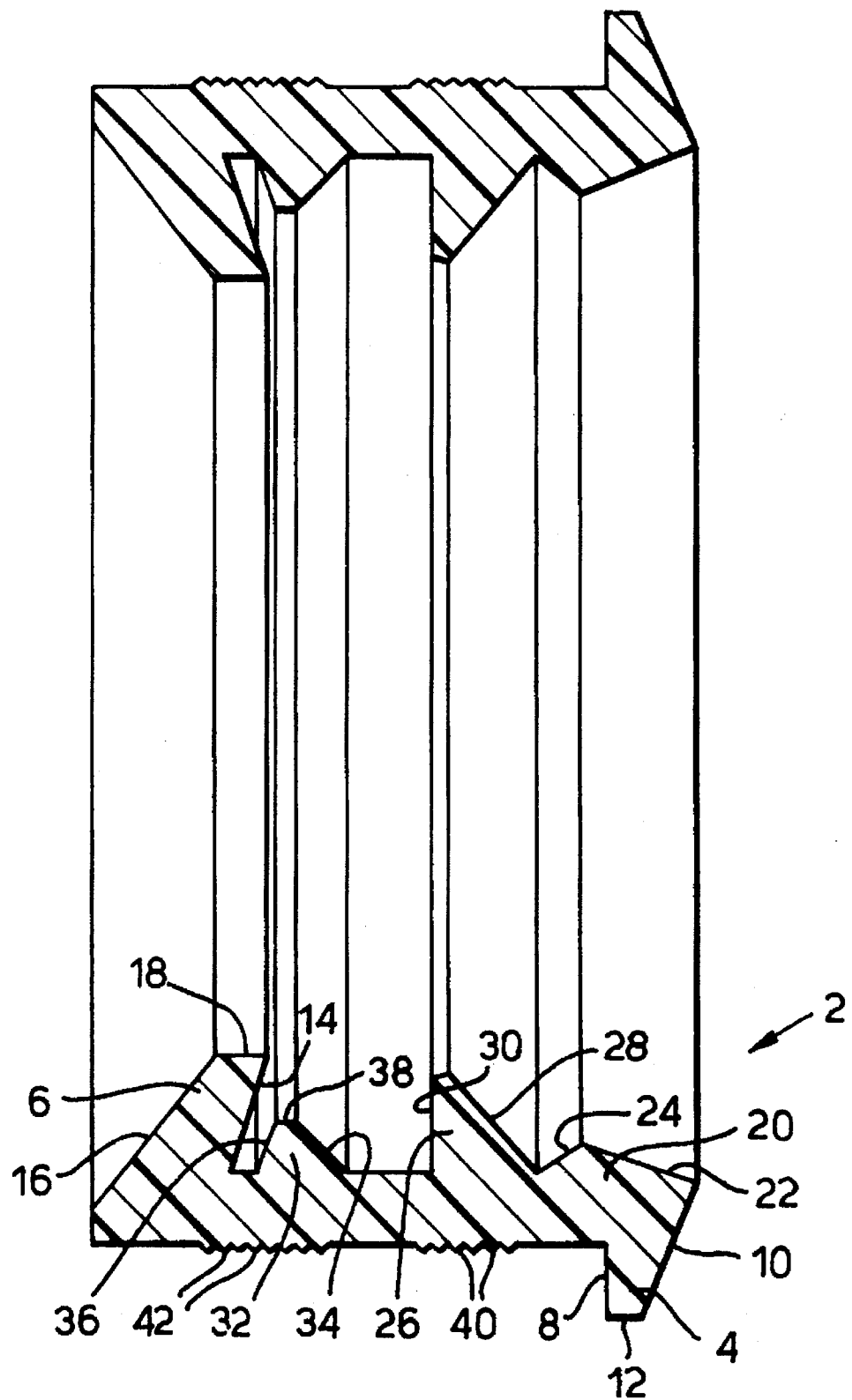
FIG. 1 is an axial section of a first embodiment of a device according to the invention.

The device according to the invention shown in FIG. 1 is constituted by a sleeve 2 consisting of rubber-elastic material having at one end an outwardly directed flange 4 and at its other end an inwardly directed flange 6. The outwardly directed flange 4 has a stop surface 8 forming a right angle with the axis of the sleeve 2. The side surface 10 of the flange 4, opposite to the stop surface 8, is inclined in such a way that the flange 4 tapers outwardly. The flange 4 is at its outer free edge surface defined by a cylindrical surface portion 12.

The inwardly directed flange 6 has a stop surface 14 forming an angle of about 70° with the axis of the sleeve. The side surface 16 of the flange 6, opposite from the stop surface 14, forms a smaller angle with the axis of the sleeve than the stop surface 14 which means that the flange 6 tapers towards the interior of the sleeve. At its inner, free edge portion the flange 6 is defined by a cylindrical surface portion 18.

At the end at which the outwardly directed flange 4 is positioned the sleeve 2 has at its inner surface an inwardly directed support strip 20 defined by two inclined side surfaces 22 and 24 connecting with each other at an inner, peripheral edge of the support strip 20. The surface 22 forms a conical entering surface facilitating the introduction of a pipe end portion into the sleeve 2.

Axially inside the support strip 20 the sleeve has an inwardly directed sealing lip 26 which at the side facing the support strip 20 is defined by an inclined surface 28 forming an angle with the axis of the sleeve of about 55° while the opposite side surface 30 of the sealing lip 26 forms a substantially right angle with the axis of the sleeve.

Between the sealing lip 26 and the inwardly directed flange 6 the sleeve has an inwardly directed support bead 32 defined by a side surface 34 facing the sealing lip 26 and forming an angle with the axis of the sleeve of about 45° and by a side surface 36 facing the inwardly directed flange 6 and forming an angle of about 60° with the axis of the sleeve. At its inner free edge the support bead 32 has a cylindrical surface portion 38.

The sleeve 2 is at its outer surface formed with peripheral ridges 40 and 42. The ridges 40 are arranged within a portion of the sleeve 2 which is positioned radially outside the sealing lip 26, while the ridges 42 are arranged within a portion of the sleeve which is positioned radially outside the support bead 32.

Figure 2:
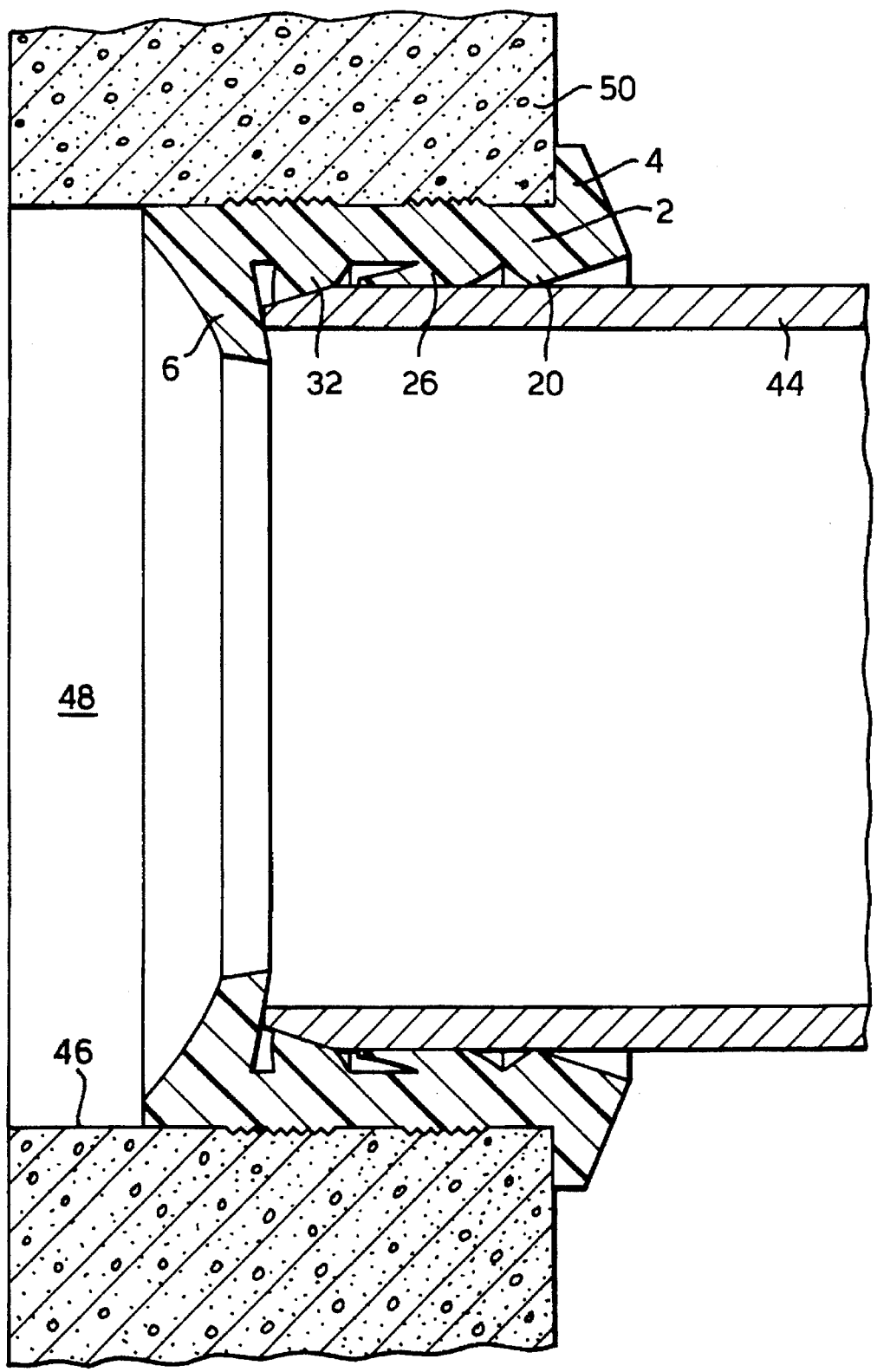
FIG. 2 is a section of a joint established between a pipe end portion and an opening of, a wall of for example, a well ring consisting of concrete, provided by means of the device shown in FIG. 1.

FIG. 2 illustrates the use of the sleeve 2 shown in FIG. 1 for connecting an end portion 44 of a plastic pipe with an opening 48 defined by a wall 46, the opening being formed in a well ring 50 or the like consisting of concrete. The sleeve 2 is positioned in the space between the wall 46 and the outer surface 52 of the pipe end portion 44 and engages by means of the stop surface 8 of the outwardly directed flange 4 the outer surface of the well ring 50 surrounding the opening 48. This provides for a correct and exact determination of the position of the sleeve 2 in relation to the well ring 50.

When the pipe end portion 44 is introduced into the sleeve 2 the pipe end portion is guided into a centered position by the surface 22 of the support bead 20. During the continuing displacement of the pipe end portion 44 into the sleeve 2 the end surface of the pipe end portion engages the lip 26 which is folded to its sealing position as shown in FIG. 2. At the same time the engagement of the pipe end portion 44 with the sealing lip 26 provides for a compression of the sleeve 2 at the portion of the sleeve 2 positioned radially outside the sealing lip 26 whereby that the ridges 40 are sealingly forced against the wall 46 of the well ring 50. The continuing displacement of the pipe end portion 44 into the sleeve 2 whereby the end of the pipe end portion 44 engages the support bead 32 in turn causing a radial compression of the sleeve 2 in the area of the support bead 32 and an accompanying sealing pressure of the ridges 42 against the wall 46 of the well ring 50.

When the end surface of the pipe end portion 44 hits the stop surface 14 of the inwardly directed flange 6 the pipe end portion 44 is correctly positioned in relation to the well ring 50.

In the position shown in FIG. 2 the pipe end portion 44 is supported in the centered position in the sleeve by the support strip 20 and by the support bead 32 whereby the sealing lip 26 is in a correct and efficient sealing position around the whole sleeve 2.

The ridges 40 and 42 efficiently prevent leakage between the sleeve 2 and the wall 46 of the well ring 50 and also prevent liquid from contacting reinforcement irons (not shown) which are exposed when the opening 48 is bored or is in any other way provided in the concrete material of the well ring 50.

Figure 3:
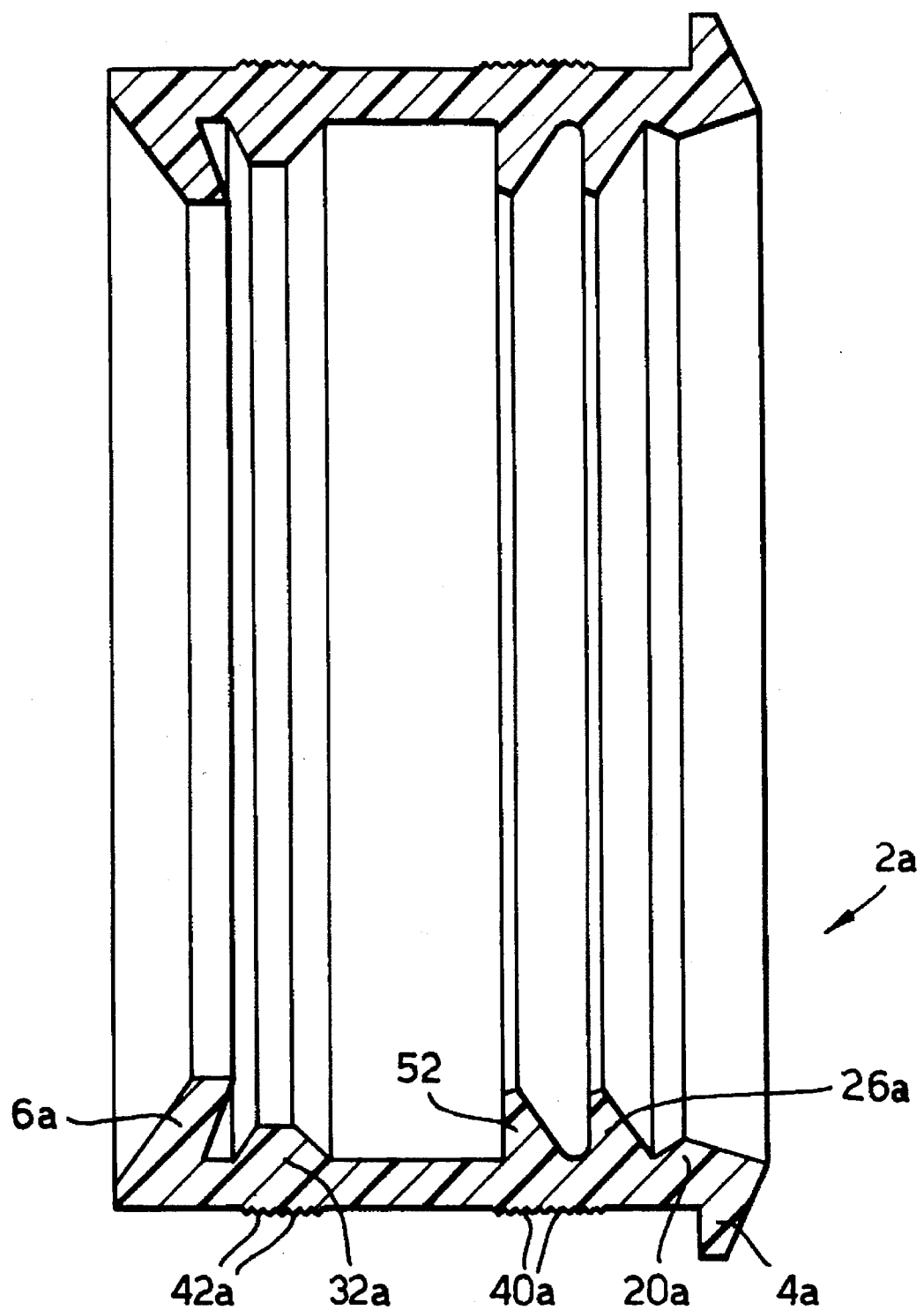
FIG. 3 is an axial section corresponding to FIG. 1 of a modified embodiment of the device according to the invention.

In FIG. 3 there is shown a modified embodiment of the sleeve-shaped device according to the invention. The sleeve shown in FIG. 3 differs from the sleeve according to FIG. 1 in the respect that it has a thinner wall thickness than the sleeve according to FIG. 1 and that it is provided with a further radially inwardly directed sealing lip 52. The rest of the parts of the sleeve shown in FIG. 3 correspond to the design of the sleeve according to FIG. 1 and are designated with the same reference numerals as in FIG. 1 with the addition of "a". The sleeve according to FIG. 3 is intended for connecting a pipe end portion with an opening, wherein the space between the wall of the opening and the outer surface of the pipe end portion is smaller.

Figure 4:
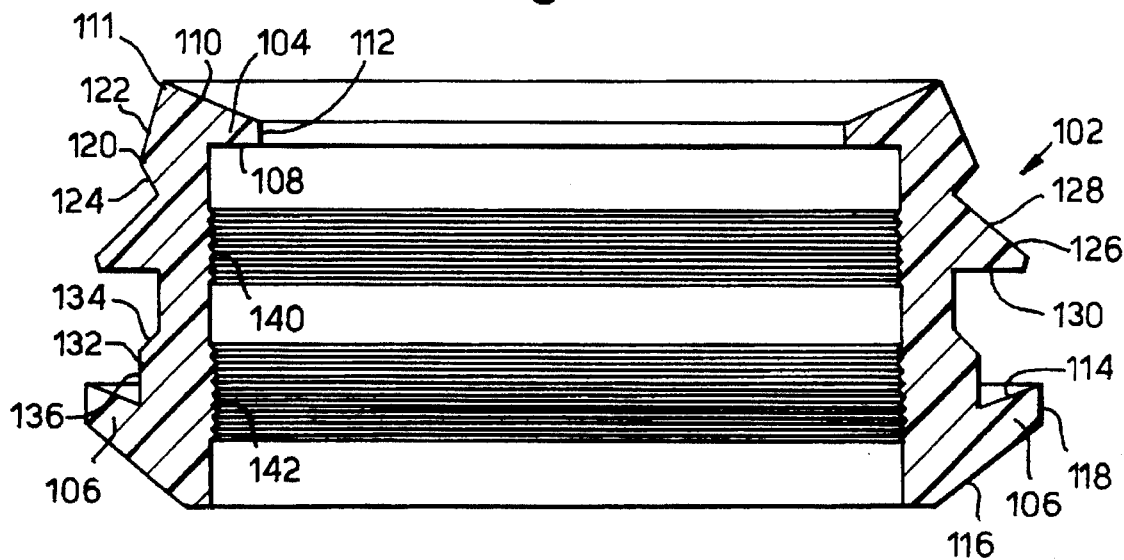
FIG. 4 is an axial section corresponding to FIGS. 1 and 3 of a further modified embodiment of the device according to the invention.

The device according to the invention shown in FIG. 4 is also constituted by a sleeve 102 consisting of rubber-elastic material. At one end the sleeve has an inwardly directed flange 104 and at its other end the sleeve has an outwardly directed flange 106. The inwardly directed flange 104 has a stop surface 108 forming a right angle with the axis of the sleeve 102. The side surface 110 of the inwardly directed flange 104 opposite to the stop surface 108 is inclined in such a way that the flange 104 tapers inwardly and forms at the upper edge of the sleeve 102 an upwardly directed continuous support strip 111. The flange 104 is at its inner free edge surface defined by a cylindrical surface portion 112.

The outwardly directed flange 106 has a stop surface 114 forming an angle with the axis of the sleeve of about 70°. The side surface 116 of the flange 106 opposite from the stop surface 114 forms a smaller angle with the axis of the sleeve than the stop surface 114 which means that the flange 106 tapers in the radial direction outwardly. The flange 106 is at its outer free edge surface defined by a cylindrical surface portion 118.

At its outer surface the sleeve 102 has at the end at which the inwardly directed flange 104 is positioned an outwardly directed support strip 120 defined by two inclined side surfaces 122 and 124 connecting with each other at an outer, peripherally extending continuous edge of the support strip 120. The surface 122 forms a conical entering surface when a socket or a pipe end portion is pushed over the sleeve 102.

Axially inside the support strip 120 the sleeve has an outwardly directed sealing lip 126 which towards the support strip 120 is defined by an inclined surface 128 forming an angle with the axis of the sleeve of about 55° while the opposite side surface 130 of the sealing lip 126 forms a substantially right angle with the axis of the sleeve.

Between the sealing lip 126 and the outwardly directed flange 106 the sleeve has an outwardly directed support bead 102 defined by a side surface 134 facing the sealing lip 126 and forming an angle of about 45° with the axis of the sleeve and by an outwardly facing cylindrical support surface 136. The support bead 132 of FIG. 4 is contiguous with the adjacent flange 106, (i.e.—there is no groove between the support bead 132 and the flange 106, which together form a single stepped projection extending from the sleeve).

At its inner surface the sleeve 102 is formed with continuous ridges 140 and 142. The ridges 140 are arranged within a portion of a sleeve 102 positioned radially inside the sealing lip 126, while the ridges 142 are arranged within a portion of the sleeve positioned radially inside the support bead 132.

Figure 5:
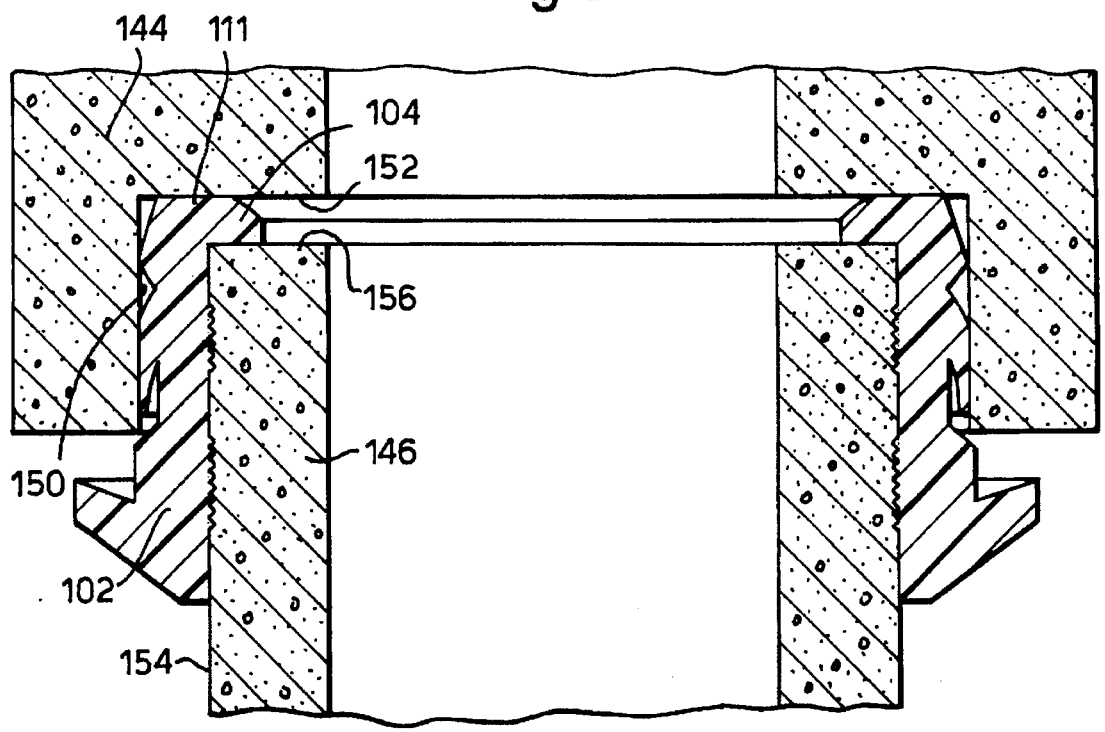
FIG. 5 is an axial section of a joint established by means of the device according to the invention shown in FIG. 3, the joint being provided between the spigot end of an upwardly extending pipe end portion and a socket of a pipe end portion placed thereon.

In FIG. 5 there is shown the use of the sleeve 102 shown in FIG. 4 for connecting a socket 144 of a concrete pipe with a spigot end 146 of an upwardly directed concrete pipe. The pipe provided with the socket 144 is placed on and rests on the concrete pipe provided with the spigot end 146. The sleeve 102 is arranged in the space between the cylindrical surface 150 and inner surface 152 of the socket 144 and the cylindrical outer surface 154 and the end surface 156 of the spigot end 146.

After the sleeve 102 has been positioned on the spigot end 146 with the inner surface engaging the cylindrical outer surface 154 of the spigot end and the surface 108 of the flange 104 contacting the end surface 156, the pipe provided with the socket 144 is lowered towards the pipe end portion 46, the socket 144 being guided over the sleeve 102 to a centered position by engagement with the surface 122 of the support strip 120. During the continuing displacement of the socket 144 downwardly over the sleeve 102, the socket 144 engages the lip 126 at its surface 150 folding the lip to the sealing position shown in FIG. 5. At the same time the engagement of the socket 144 with the sealing lip 126 establishes a compression of the sleeve 102 at the portion thereof positioned radially inside the sealing lip 126 whereby the ridges 140 are sealingly forced against the wall 154 of the spigot end 146. When the socket 144 is displaced over the sleeve 102 the inner surface 152 of the socket will engage the support strip 111 which means that the inwardly directed flange 104 will be compressed between the surface 152 of the socket and the surface 156 of the spigot end until the pipe provided with the socket 144 is as a whole supported by the pipe provided with the spigot end 146 through the flange 104 of the sleeve 102.

The invention can be modified within the scope of the following claims.

I claim:

1. A device for sealing a space between an annular wall, the annular wall defining an opening, and a pipe end introduced into the opening, said device comprising:

a sleeve comprising a rubber-elastic material, said sleeve having a first and second end, an outwardly directed flange extending from said sleeve at said first end whereby the introduction of said sleeve into the opening is restricted;

an inwardly directed flange extending from said sleeve at said second end whereby the introduction of the pipe end into said sleeve is restricted;

a support bead comprising an annular band of material protruding from said sleeve and forming a region of increased sleeve thickness, said support bead disposed between said inwardly and outwardly directed flanges, said support bead is integral with an adjacent one of said flanges and protrudes in the extending direction of said adjacent flange, a protruding edge of said support bead defining a support surface extending in an axial direction and having a diameter substantially equal to one of an interior diameter of said annular wall and an outer diameter of said pipe end, said adjacent flange having a length extending from said sleeve, said support bead having a length extending from said sleeve, said extending length of said flange being greater than said extending length of said support bead, said support bead axially contiguous with said adjacent flange, whereby said support surface extends in said axial direction from said adjacent flange and said support bead and said adjacent flange form a single stepped projection extending from said sleeve; and an annular sealing lip extending from said sleeve in the protruding direction of said support bead, said extending length of said sealing lip being greater than said extending length of said support bead.

2. A device as claimed in claim 1, characterized in that the support surface is cylindrical.

3. A device as claimed in claim 2, characterized in that the support bead has a decreasing width in its protruding direction.

4. A device as claimed in claim 1, characterized in that the support bead has a side surface disposed opposite said adjacent flange which forms an angle of about 45° with the axis of the sleeve.

5. The device as claimed in claim 1 wherein said support bead and said adjacent flange are outwardly directed.

6. A device for sealing a space between an annular wall, the annular wall defining an opening, and a pipe end introduced into the opening, said device comprising:

a sleeve comprising a rubber-elastic material, said sleeve having a first and second end, an outwardly directed flange extending from said sleeve at said first end whereby the introduction of said sleeve into the opening is restricted;

an inwardly directed flange extending from said sleeve at said second end whereby the introduction of the pipe end into said sleeve is restricted;

a support bead comprising an annular band of material protuding from said sleeve and forming a region of increased sleeve thickness, said support bead disposed between said inwardly and outwardly directed flanges adjacent one of said flanges and protruding in the extending direction of said adjacent flange, a protruding edge of said support bead defining a support surface extending in an axial direction and having a diameter substantially equal to one of an interior diameter of said annular wall and an outer diameter of said pipe end, said adjacent flange having a length extending from said sleeve, said support bead having a length extending from said sleeve, said extending length of said flange being greater than said extending length of said support bead, said support bead axially contiguous with said adjacent flange, whereby said support surface extends in said axial direction from said adjacent flange and said support bead and said adjacent flange form a single stepped projection extending from said sleeve; and an annular sealing lip extending from said sleeve in the protruding direction of said support bead, said extending length of said sealing lip being greater than said extending length of said support bead.

7. A device for sealing a space between an annular wall, the annular wall defining an opening, and a pipe end introduced into the opening, said device comprising:

a sleeve comprising a rubber-elastic material, said sleeve having a first and second end, an outwardly directed flange extending from said sleeve at said first end whereby the introduction of said sleeve into the opening is restricted;

an inwardly directed flange extending from said sleeve at said second end whereby the introduction of the pipe end into said sleeve is restricted; and a support bead comprising an annular band of material protruding from said sleeve and forming a region of increased sleeve thickness, said support bead disposed between said inwardly and outwardly directed flanges adjacent one of said flanges and protruding in the extending direction of said adjacent flange; said support bead having a side surface facing said adjacent flange, said side surface forming an angle of about 60° with the axis of the sleeve.

8. A device for sealing a space between an annular wall, the annular wall defining an opening, and a pipe end introduced into the opening, said device comprising:

a sleeve comprising a rubber-elastic material, said sleeve having a first and second end, an outwardly directed flange extending from said sleeve at said first end whereby the introduction of said sleeve into the opening is restricted;

an inwardly directed flange extending from said sleeve at said second end whereby the introduction of the pipe end into said sleeve is restricted;

a support bead comprising an annular band of material protruding from said sleeve and forming a region of increased sleeve thickness, said support bead disposed between said inwardly and outwardly directed flanges adjacent one of said flanges and protruding in the extending direction of said adjacent flange, a protruding edge of said support bead defining a support surface extending in an axial direction and having a diameter substantially equal to one of an interior diameter of said annular wall and an outer diameter of said pipe end, said adjacent flange having a length extending from said sleeve, said support bead having a length extending from said sleeve, said extending length of said flange being greater than said extending length of said support bead, said support bead axially contiguous with said adjacent flange, whereby said support surface extends in said axial direction from said adjacent flange and said support bead and said adjacent flange form a single stepped projection extending from said sleeve; and a plurality of annular ridges disposed on said sleeve, said ridges are disposed radially opposite a compressive member comprising one of a sealing lip and said support bead extending from said sleeve in a radial direction away from said ridges whereby radially oriented compressive forces generated by said compressive member force said ridges into engaging contact with one of the annular wall and the pipe end.

* * * * *